(12) United States Patent
Fountain et al.

(10) Patent No.: US 8,191,509 B2
(45) Date of Patent: Jun. 5, 2012

(54) LITTER BOX WITH REMOVABLE SHIELD

(75) Inventors: Catherine Elizabeth Fountain, Rockville Centre, NY (US); Patricia Waterbury, Massapequa, NY (US)

(73) Assignees: Catherine E. Fountain, Rockville Centre, NY (US); Patricia Waterbury, Massapequa, NY (US)

( * ) Notice: Subject to any disclaimer, the term of this patent is extended or adjusted under 35 U.S.C. 154(b) by 652 days.

(21) Appl. No.: 12/290,794

(22) Filed: Nov. 4, 2008

(65) Prior Publication Data

US 2009/0126643 A1 May 21, 2009

Related U.S. Application Data

(60) Provisional application No. 61/003,453, filed on Nov. 16, 2007.

(51) Int. Cl.
*A01K 29/00* (2006.01)
(52) U.S. Cl. ........................................ 119/165; 119/166

(58) Field of Classification Search .................. 119/161, 119/165, 166; 40/308, 312; 206/767, 768
See application file for complete search history.

(56) References Cited

U.S. PATENT DOCUMENTS

| 1,773,141 | A | * | 8/1930 | Hodgson | 119/165 |
|---|---|---|---|---|---|
| 3,827,401 | A | * | 8/1974 | Franzl | 119/169 |
| 5,893,336 | A | * | 4/1999 | Vice et al. | 119/166 |
| 6,129,050 | A | * | 10/2000 | Carbajal | 119/165 |
| 7,380,519 | B2 | * | 6/2008 | Ikegami et al. | 119/167 |
| 2007/0084413 | A1 | * | 4/2007 | Oertel et al. | 119/165 |
| 2008/0060585 | A1 | * | 3/2008 | Garfield | 119/165 |
| 2010/0300367 | A1 | * | 12/2010 | Askinasi | 119/161 |

* cited by examiner

*Primary Examiner* — Kristen C Hayes

(57) ABSTRACT

A litter box assembly is provided that includes a tray for containing litter and a shield that can be removably mounted to the tray for reducing or preventing the scattering of litter material outside the tray. The shield effectively extends the height of the tray along three sides and can be removed for cleaning between litter changes. A self supporting shield for a litter box tray is further provided as well as a method for reducing the scattering of litter material by a cat or other animal.

14 Claims, 2 Drawing Sheets

LITTER BOX WITH REMOVABLE SHIELD

BACKGROUND OF THE INVENTION

1. Field of the Invention

The field of the invention relates to litter boxes intended for animals such as cats and methods for assembling litter box assemblies to reduce the scattering of litter.

2. Brief Description of the Related Art

Litter boxes have been used for many years. They come in many different shapes, sizes and colors. Often, when an animal utilizes the litter box, urine, feces and litter material escapes from the litter box. In addition, areas surrounding the litter box can become saturated and stained with urine. Cleaning one piece litter boxes usually consists of dumping the entire contents of the litter box, cleaning the litter box, and providing the litter box with fresh litter material. Litter box liners can extend the length of cleaning the litter box but do nothing to address the problem of animal excrement and scatter from coming out of the box and onto the surrounding area.

SUMMARY OF THE INVENTION

A litter box assembly is provided that allows for a simple and effective way of dealing with cleaning in-between litter changes. The assembly includes a tray and a shield that is removably positioned within or on the tray. The shield is preferably three-sided and self-supporting such that it can simply be placed within the tray and stand upright on the bottom surface of the tray. There are other ways in which the shield may be removably attached to the litter box. Clips or other suitable fasteners may be included on the sides of the shield which for coupling onto the lip of the litter box tray, thereby not touching the contents of the litter box at all. A user could simply unclip the shield and clean. In accordance with a second alternative embodiment, the tray includes vertically extending pegs. These pegs could accept a shield with complementary holes provided therein. The shield can be of integral construction or comprised of three interconnected pieces that can be disassembled for cleaning. If the shield and tray include coupling features such as those described above, the shield can be comprised of separate elements that are individually coupled to the tray.

As discussed above, the shield may be of integral construction, comprised of separate but connected walls, or comprised of unconnected wall elements. The shield is mounted to the tray to provide three vertical wall surfaces, each having a height greater than the heights of the corresponding vertical side walls of the tray. In accordance with a preferred embodiment of the invention, the shield is mounted within the side walls of the tray such that it is supported by the bottom wall of the tray.

DETAILED DESCRIPTION OF THE INVENTION

The present invention is intended to provide pet owners with a litter box that limits the amount of urine, feces and litter material that comes out of the box during a pet's use of the litter box. Advantageously, a removable, three-sided shield can be wiped clean of said material whenever the pet owner sees fit. Both the litter tray and the removable shield work in tandem to keep the area around the litter box cleaner. While the invention is capable of modification, the specification which follows provides exemplary and preferred embodiments. It should be understood that the invention is not intended to be limited to the particular embodiments disclosed herein, but on the contrary is intended to cover all modifications, equivalents and alternatives falling within the spirit and scope of the invention.

Figure 2:
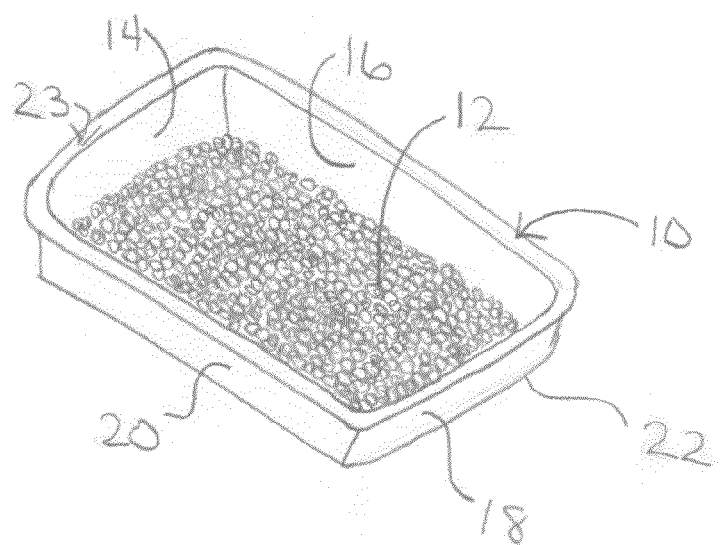
FIG. 2 is a top perspective view of a litter box containing litter.

With reference to the figures there is shown an animal litter box comprising a tray 10 as shown in FIG. 2. In accordance with the preferred embodiment of the invention, the tray 10 can be of conventional construction such as those commercially available at retail stores. Litter material 12 is provided within the tray to a selected depth depending on the size of the animal to be using the tray and/or the owner's personal preferences. For example, about 3-4" of any suitable litter material may be provided within the tray. The tray 10 includes side walls 14, 16, 18 and 20 and a bottom wall 22 that define a generally rectangular enclosure. Each side wall may be about five inches in height. Dimensions of the tray may range between twenty and twenty-two inches in length and sixteen to eighteen inches in width.

Figure 1:
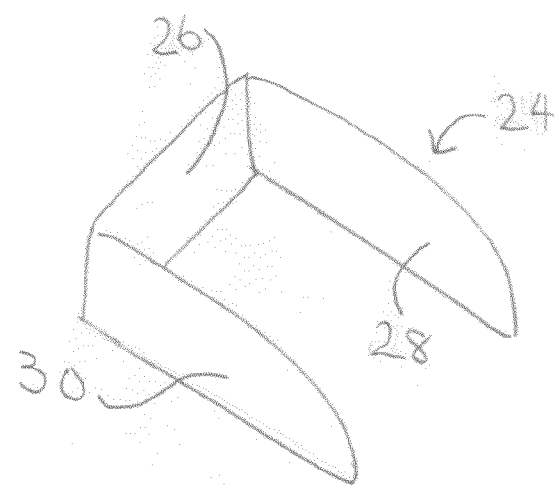
FIG. 1 is a top perspective view of a litter box shield in accordance with the invention.

The maximum height of the shield 24 used in conjunction with the tray, as shown in FIG. 1, is preferably at least about twice the height of the tray with which it is used. The width of the shield is preferably about the same as the distance between the relatively long walls 16,18 of the tray while the length of the shield approximates the length of the tray. The specific tray dimensions are provided by way of example and, though preferred, are not considered critical. The dimensions of the tray and shield may indeed vary depending upon the size of the animal to be using the assembly. The tray preferably includes a peripheral lip 23 to facilitate handling.

When a small animal urinates or defecates within the tray, it usually buries the waste within the litter material, thereby scattering materials within and sometimes outside the tray. In accordance with the invention, the shield 24 in accordance with the preferred embodiment is provided as a tray insert. Scattering of the litter material outside the tray is reduced or prevented by the shield as it provides a more effective barrier than the walls of the tray do by themselves. As shown in FIG. 1, the three-sided shield 24 includes a rear panel 26, opposing side panels 28, 30 integrally joined to the rear panel 26, and an open end. The rear panel in this preferred embodiment is approximately 15"-17" long and approximately 12" in height. The two side panels are each approximately twelve inches in height where they adjoin the rear panel 26 and taper down to about six inches at their distal ends. This reduction in height allows the animal to more easily enter or exit the tray. The side panels in this preferred embodiment are approximately nineteen to twenty-one inches in length. Depending upon the size of the tray with which the shield is to be used, the maximum height of the shield can be between about ten to fifteen inches, the width between about fourteen and twenty inches, and the length between about fourteen to twenty-four inches. Specifically, the rear panel height can be about ten to fifteen inches, the distance between opposing side panels 28,30 about fourteen to twenty inches, and the length of the opposing side panels between about fourteen to twenty-four inches. The shield can be made of plastic or any other suitable rigid or semi-rigid material. It is designed to be washable, but can be made from cardboard or the like if intended to be disposable.

Figure 3:
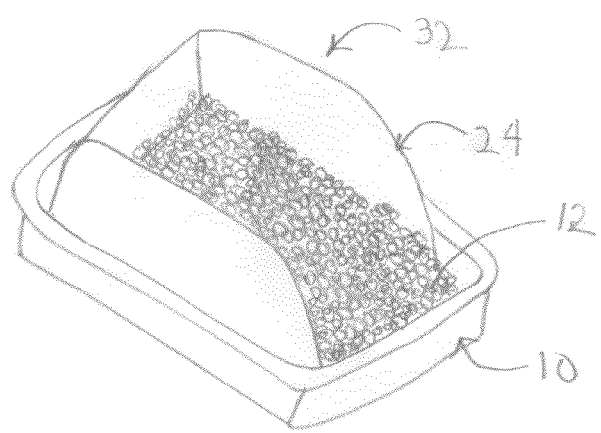
FIG. 3 is a top perspective view of a litter box assembly including a litter box containing litter and a shield mounted within the litter box.

In use, the tray 10 is filled with litter material 12 to a desired depth. The shield 24 is positioned within the tray such that its rear panel 26 adjoins the wall 14 at one end of the tray and the side panels 28, 30 adjoin opposing and preferably substantially parallel side walls 16, thereof forming the litter box assembly 32 shown in FIG. 3. The shield is supported by the bottom wall 22 of the tray and is preferably pushed through the litter so that it actually engages the bottom wall. The litter material also helps maintain the shield in position. The shield may be inserted either before or after the litter material is added. When an animal uses the litter box assembly 32 comprising the tray 10 and shield 24, it is much less likely to scatter materials outside the tray due to the increased height provided along three sides of the tray. The shield 24 may be removed from the litter box for cleaning at any time, including between changes of the litter material itself.

While the shield shown in the drawings is of integral, one piece construction, other alternatives may be employed. In a first alternative embodiment (not shown), the three panels of the shield are discrete elements that are coupled to each other by appropriate fastening mechanisms. When assembled, the resulting shield closely resembles the shield 24 shown in the drawings and is used in the same way. Tongue and groove fasteners may, for example, be incorporated in the shield panels to provide releasable coupling. In a second alternative embodiment (not shown), the shield is comprised of three discrete panels that are not necessarily connected to each other, but are instead removably secured to three side walls 14, 16, 20 of the tray 10. Such panels would preferably extend into the tray when in use, though they could instead simply extend upwardly from the lip of the tray once fastened to it.

In accordance with a further embodiment of the invention, the integral shield 24 is provided with clips or other fasteners (not shown) that secure the shield to the lip 23 of the tray 10. The shield may be designed to extend into the tray and litter material or to avoid contacting the contents of the tray at all.

While the shields as described above can be used with conventional trays of the type shown in FIG. 2, litter box assemblies are contemplated wherein the tray and shield are each specifically designed for mutual engagement. For example, one of the tray or the shield may be provided with pegs while the other of the tray or shield is provided with complementary recesses for receiving the pegs (not shown). The shield may be removably coupled to the tray by sliding it onto the tray, causing engagement of the pegs and recesses. Shields in accordance with the invention can also be designed to fit non-rectangular trays.

What is claimed is:

1. A litter box assembly comprising:
   a tray for containing litter material, the tray including a bottom wall, opposing pairs of side walls, and a peripheral lip joined to the side walls, and
   a shield removably mountable within the tray such that it can extend above the tray and engage the bottom wall of the tray, the shield including a rear panel, two opposing side panels and an open end, wherein a width and length of the shield approximate a width and length of the tray, and a height of the shield is about twice a height of the tray, wherein the panels of the shield are positionable within the tray to prevent or reduce scattering of litter material outside the tray by an animal using the tray.

2. A litter box assembly as described in claim 1 wherein the shield is mounted to the tray and further including litter material within said tray.

3. A litter box assembly as described in claim 1 wherein the bottom wall and opposing pairs of side walls of the tray define a generally rectangular enclosure, the side walls of the tray being about five inches in height.

4. A litter box assembly as described in claim 3 wherein the height of the shield is at least about twice the height of the tray.

5. A litter box assembly as described in claim 3 wherein the side panels of the shield taper downwardly in height in a direction away from the rear panel.

6. A litter box assembly as described in claim 5 wherein the height of the shield is at least about twice the height of the tray.

7. A litter box assembly as described in claim 3 wherein each of the side panels of the shield includes an end secured to the rear panel.

8. A litter box assembly as described in claim 7 wherein the height of the shield is at least about twice the height of the tray and the side panels of the tray taper downwardly in height in a direction away from the rear panel.

9. A litter box assembly as described in claim 3 wherein the shield engages the bottom wall of the tray.

10. A method of preventing or reducing the scattering of litter material used by an animal comprising:
    providing a tray having four generally vertical side walls, a bottom wall and a peripheral lip extending from the generally vertical side walls of the tray; filling the tray with litter material suitable for burying animal waste; and
    removably inserting a self-supporting shield within the tray to provide three generally vertical wall surfaces such that the shield is supported by the bottom wall of the tray, wherein the shield includes a rear panel and two opposing side panels secured to the rear panel, wherein the wall surfaces each have a height substantially greater than the heights of the side walls of the tray with two generally vertical side wall surfaces being in opposing relation to each other and the other generally vertical side walls being substantially perpendicular to the two opposing generally vertical wall surfaces.

11. A method as described in claim 10 including the step of mounting the shield such that the rear and opposing side panels adjoin three of the four generally vertical side walls of the tray, the side walls of the tray being about five inches in height.

12. A method as described in claim 10, wherein the generally vertical side walls of the tray are about five inches in height and, with the bottom wall, define a generally rectangular enclosure.

13. A method as described in claim 10 wherein the shield is a self supporting structure including a rear panel and two opposing side panels secured to the rear panel, including mounting the shield within the tray such that the shield engages the bottom wall of the tray.

14. A method as described in claim 10 including mounting the shield to the tray such that the shield adjoins at least three of the side walls of the tray.

* * * * *